United States Patent Office 2,750,296
Patented June 12, 1956

2,750,296

PRINTING INK

Joseph G. Curado, Rutherford, and Delbert H. Praeg, Bloomfield, N. J., assignors to Sun Chemical Corporation, Long Island City, N. Y., a corporation of Delaware No Drawing. Application February 13, 1952,
Serial No. 271,424

4 Claims. (Cl. 106—30)

The present invention relates to printing inks and relates more particularly to printing inks adapted for high speed printing operations.

An object of the present invention is to provide printing inks adapted for high speed web press printing which exhibit very little flying tendencies under high speed printing conditions.

Other objects of the present invention will be apparent from the following description and appended claims.

The printing inks which have come into almost universal use for the printing of news stock in volume newspaper publication usually comprise a pigmented vehicle which consists essentially of a mineral oil base containing a resinous binder material in greater or lesser amounts depending upon the particular characteristics desired in the ink. While the main reason for the adoption of this type of printing ink for newspaper publication was largely economic, that is, because of the relatively low cost of these inks as compared to printing inks employed in other fields of printing, the use thereof was only permissible because of the nature of the paper stock used in such printing. Due to the porosity of such paper stock, setting of an imprinted ink film may be effected primarily by absorption of the ink film into the paper, thus permitting the use in the printing thereof of the non-drying mineral oil base printing inks.

The greatly expanded circulation of modern newspapers has brought about the development and use of high speed web presses in the printing of such publications. However, with the introduction of such high speed printing presses for newspaper publication, many new printing problems arose, one of which was concerned with the effect of the rotational speed of the ink distributing rollers and of the printing cylinder upon the printing ink utilized. Due to the high rotational speeds of these parts of the printing press, an extremely fine mist or spray of ink is thrown off the rollers and printing cylinders during the printing operation which usually coats everything in the vicinity of the printing press with a sticky layer of ink, much to the dismay of the pressroom workers and to the detriment of production. This effect, occurring under high speed printing operations, is known in the trade as "flying" or "misting" and is characteristic of most mineral oil-base printing inks.

In accordance with the present invention, there are provided mineral oil-base printing inks adapted for high speed web press printing operations which are substantially non-flying or exhibit only very slight flying tendencies under high speed printing conditions.

The printing inks of the present invention comprise coloring material dispersed in a vehicle comprising an oil-soluble resinous binder material dissolved in mineral oil, and containing therein a long chain aliphatic amine bentonite containing 34 carbon atoms in the aliphatic chain.

Bentonite itself is a plastic clay which swells immensely when wetted with water. Sodium bentonite, as the salt of a large inorganic anion, is capable of base exchange reactions involving both inorganic and organic cations. Thus when sodium bentonite is reacted with, for example, an amine salt such as an amine chloride, a base exchange reaction occurs with the formation of an organic amine-substituted bentonite as one of the products. The organic amine-substituted bentonite utilized in carrying out the present invention is one resulting from the base exchange reaction of sodium bentonite with an aliphatic amine salt of 34 carbon atoms in the aliphatic chain.

The mineral oils employed as the liquid medium of the inks of the present invention are of the type commonly utilized in the preparation of news inks. These oils are to be distinquished from the high boiling petroleum fractions, such as kerosene and the like, which are commonly utilized in the preparation of the so-called heat set inks. The mineral oils referred to herein are very similar to the common lubricating oils and are characterized by being substantially non-distillable at atmospheric pressures without cracking thereof.

Generally, any of the resinous materials which are soluble in the mineral oils employed as the liquid portion of the vehicles of the inks of the present invention may be utilized as the resinous binder materials thereof. Thus, for example, there may be employed asphaltic materials such as gilsonite, oil-soluble pitch, wood or gum rosin, rosin esters such as ester gum, modified phenol-formaldehyde resins such as rosin-modified phenol-formaldehyde resin, hydrocarbon resins obtained from petroluem distillates, coumarone-indene resins, etc.

The printing inks of the present invention may be prepared by any of the methods commonly utilized in the printing ink industry. For example, the ink vehicle is satisfactorily prepared by effecting solution of the resinous binder material in the mineral oil and the dry pigment normally utilized as the coloring material of printing inks and the amine bentonite hereinbefore described may then be incorporated in the ink vehicle by the usual methods of mixing and milling as by the use of the well known three-roll mill or ball mill. In order to obtain the particularly desirable results obtained with the printing inks of the present invention, it is only necessary that the amine bentonite employed in carrying out the present invention be employed in an amount corresponding to from approximately 0.1 to approximately 3.0% by weight based upon the weight of the finished ink. When the amine bentonite is employed in the printing inks in such amounts, the inks exhibit greatly reduced flying tendencies when utilized in high speed web press printing operations, such reduction in the amount of flying amounting to at least 60% of that normally obtained with inks not containing the amine bentonite. Further, there is no appreciable change in the body, length or flow characteristics of the inks as compared to similar inks not containing the amine bentonite. However, when the amine bentonite hereinbefore described is utilized in amount substantially in excess of 3.0% by weight based upon the weight of the finished ink, the consistency, flow, and other properties affecting the printing characteristics of the said inks are seriously impaired. Therefore, to obtain the results desired with the printing inks of the present invention, the amount of amine bentonite which should be used in preparing inks having the characteristics of those of the present invention should be maintained within the limits set forth above.

The following examples are illustrative of successful commercial printing inks prepared in accordance with the present invention. The viscosities of the mineral oils utilized are measured in terms of Saybolt Universal viscosity.

*Example 1*

| | Parts by weight |
|---|---|
| Mineral oil (viscosity 100–110 sec. at 100° F.) | 15.8 |
| Mineral oil (viscosity 260–280 sec. at 130° F.) | 70.0 |
| Gilsonite | 1.2 |
| Carbon black | 12.0 |
| Amine bentonite | 1.0 |
| | 100.0 |

*Example 2*

| | Parts by weight |
|---|---|
| Mineral oil (viscosity 100–110 sec. at 100° F.) | 14.0 |
| Mineral oil (viscosity 260–280 sec. at 130° F.) | 70.0 |
| Rosin | 2.0 |
| Carbon black | 12.0 |
| Amine bentonite | 2.0 |
| | 100.0 |

*Example 3*

| | Parts by weight |
|---|---|
| Mineral oil (viscosity 100–110 sec. at 100° F.) | 14.5 |
| Mineral oil (viscosity 260–280 sec. at 130° F.) | 68.0 |
| Coumarone-indene resin | 3.0 |
| Carbon black | 12.0 |
| Amine bentonite | 2.5 |
| | 100.0 |

*Example 4*

| | Parts by weight |
|---|---|
| Mineral oil (viscosity 100–110 sec. at 100° F.) | 20.0 |
| Mineral oil (viscosity 260–280 sec. at 130° F.) | 64.0 |
| Rosin-modified phenol-formaldehyde resin | 4.5 |
| Carbon black | 10.0 |
| Amine bentonite | 1.5 |
| | 100.0 |

The printing inks of the present invention as typified by the above illustrative formulations, are particularly adapted for use in high speed newspaper publication work and display very little tendency to fly under such conditions. Just why such properties are obtained in the printing inks of the present invention is not known for certain but it is believed that the incorporation of the amine bentonite in the printing inks of the present invention substantially eliminates the tendency of the printing inks to form miute thread-like particles of ink between the distribution rollers of the printing press and between the form rollers and the printing cylinder at high operating speeds which particles, it is thought, are ordinarily thrown from the rollers and thus cause the effect known as "flying."

The printing inks of the present invention should not be considered as being necessarily restricted to the specific materials disclosed in the illustrative examples but may contain, in addition, the usual ink additives customarily employed in such printing inks. Thus, for example, the common oil-soluble toners utilized to overcome the brownish tone of the mineral oil and carbon black pigment may be employed in the printing inks of the present invention. Small amounts of waxes or greases usually added to printing inks to impart special properties thereto may also be incorporated in the printing inks of the present invention without affecting the particularly desirable results obtained therewith. The use of such ink additives in printing inks is well known in the art and the incorporation of the same in the printing inks of the present invention may be made without adversely affecting the particularly desirable properties thereof.

While the above products constitute preferred embodiments of the present invention, changes may be made therein without departing from the scope of the invention as defined in the appended claims.

What is claimed is:

1. A printing ink with inhibited misting tendencies consisting of coloring material dispersed in a vehicle, said vehicle consisting essentially of an oil-soluble resinous binder and a mineral oil as the solvent for said resinous binder, said mineral oil being substantially non-distillable at atmospheric pressures, and including from approximately 0.1% to approximately 3.0% by weight based on the weight of the ink of a long chain aliphatic amine bentonite containing 34 carbon atoms in the aliphatic chain.

2. A printing ink with inhibited misting tendencies consisting of coloring material dispersed in a vehicle, said vehicle consisting essentially of gilsonite and a mineral oil as the solvent therefor, said mineral oil being substantially non-distillable at atmospheric pressures, and including from approximately 0.1% to approximately 3.0% by weight based on the weight of the ink of a long chain aliphatic amine bentonite containing 34 carbon atoms in the aliphatic chain.

3. A printing ink with inhibited misting tendencies consisting of coloring material dispersed in a vehicle, said vehicle consisting essentially of rosin and a mineral oil as the solvent therefor, said mineral oil being substantially non-distillable at atmospheric pressures, and including from approximately 0.1% to approximately 3.0% by weight based on the weight of the ink of a long chain aliphatic amine bentonite containing 34 carbon atoms in the aliphatic chain.

4. A printing ink with inhibited misting tendencies consisting of coloring material dispersed in a vehicle, said vehicle consisting essentially of a hydrocarbon resin and a mineral oil as the solvent therefor, said mineral oil being substantially non-distillable at atmospheric pressures, and including from approximately 0.1% to approximately 3.0% by weight based on the weight of the ink of a long chain aliphatic amine bentonite containing 34 carbon atoms in the aliphatic chain.

References Cited in the file of this patent

UNITED STATES PATENTS

| | | |
|---|---|---|
| 39,968 | Steinert | Sept. 15, 1863 |
| 741,734 | Spohnq | Dec. 20, 1903 |
| 824,475 | Friedmann | June 26, 1906 |
| 1,383,512 | Barmier | July 5, 1921 |
| 1,858,449 | Knight | May 17, 1932 |
| 2,078,170 | Wilson | Apr. 20, 1937 |
| 2,397,019 | Kroeger | Mar. 19, 1946 |
| 2,544,873 | Adams | Mar. 13, 1951 |
| 2,559,398 | Capell | July 3, 1951 |
| 2,622,987 | Ratcliffe | Dec. 23, 1952 |